United States Patent
Ohkoshi et al.

[11] Patent Number: 6,035,899
[45] Date of Patent: Mar. 14, 2000

[54] FIBER-REINFORCED RUBBER HOSE

[75] Inventors: Hiroshi Ohkoshi; Takashi Suzuki, both of Chiba; Tatsumi Onishi, Kanagawa; Hiroshi Okuyama, Kanagawa; Shin Kusama, Kanagawa, all of Japan

[73] Assignees: Kinugawa Rubber Ind. Co., Ltd., Chiba; Nissan Motor Co., Ltd., Yokohama, both of Japan

[21] Appl. No.: 09/012,551

[22] Filed: Jan. 23, 1998

[30] Foreign Application Priority Data

Jan. 23, 1997 [JP] Japan ................................ 9-010027

[51] Int. Cl.7 ...................................... F16L 11/00
[52] U.S. Cl. .......................... 138/123; 138/124; 138/126; 138/137
[58] Field of Search ................... 138/123, 130, 138/126, 137, 174, 129, 125, 124, 127, 133, 138, 140, 141

[56] References Cited

U.S. PATENT DOCUMENTS

| | | | |
|---|---|---|---|
| 4,690,866 | 9/1987 | Kumakawa et al. | 428/364 |
| 4,759,388 | 7/1988 | Kiyama et al. | 138/130 |
| 5,252,407 | 10/1993 | Kamiyama et al. | 428/480 |

FOREIGN PATENT DOCUMENTS

| | | |
|---|---|---|
| 6-99515 | 4/1994 | Japan . |
| 6-47720 | 12/1994 | Japan . |

*Primary Examiner*—Patrick Brinson
*Attorney, Agent, or Firm*—Foley & Lardner

[57] ABSTRACT

The invention relates to a fiber-reinforced rubber hose having an inner tubular portion made of a first rubber; an outer tubular portion which is made of a second rubber and surrounds the inner tubular portion; and a reinforcing layer interposed between the inner and outer tubular portions. At least one of the first and second rubbers is a carboxyl-containing acrylic elastomer prepared by vulcanizing a carboxyl-containing acrylic copolymer. The reinforcing layer is prepared from polyester fibers containing terminal carboxyl groups which are in an amount of up to 20 equivalents per metric ton of the polyester fibers. The rubber hose can be produced with a relatively low cost due to the use of polyester fibers. Furthermore, the rubber hose is superior in metal contact resistance and calcium chloride resistance, in addition to satisfactory heat resistance, oil resistance, pressure resistance and sealing capability.

9 Claims, 1 Drawing Sheet

FIBER-REINFORCED RUBBER HOSE

The contents of Japanese Patent Application No. 9-10027, with a filing date of Jan. 23, 1997, are hereby incorporated by reference.

BACKGROUND OF THE INVENTION

The present invention relates to fiber-reinforced rubber hoses used for, for example, automotive radiator and automotive tubing for cooling down the automatic transmission fluid.

Hitherto, there have been proposed various fiber-reinforced rubber hoses. For example, Japanese Utility Model Examined Publication JP-Y-6-47720 discloses a fiber-reinforced rubber hose having an inner tubular rubber portion, an outer tubular rubber portion, and a reinforcing layer interposed therebetween. It is disclosed in this publication that at least one of the inner and outer rubber portions is prepared by using a special rubber composition. This rubber composition is a blend of 70–90 wt % of a carboxyl-containing acrylic copolytmerized elastomer and 30–10 wt % of a carboxyl-containing ethylene-acrylate copolymer elastomer. The reinforcing layer of this rubber hose is made of aromatic polyamide fibers. In general, aromatic polyamide fibers are superior in heat resistance, chemical resistance and strength, but are very high in price. Thus, the use of aromatic polyamide fibers may substantially increase the production cost of fiber-reinforced rubber hoses. Such conventional fiber-reinforced rubber hoses are superior in heat resistance, oil resistance, pressure resistance, and sealing capability to prevent leak from a joint where a metal pipe has been pressed into the rubber hose. Recently, some metal pipes have been plated with Sn and Zn for the anticorrosive purpose. It is thus desired to provide a fiber-reinforced rubber hose which hardly deteriorates even if it is in contact with such a Sn—Zn plated metal pipe. In general, a snow melting agent (calcium chloride) is scattered on the road in the winter in a snowy region. In case that a fiber-reinforced rubber hose is attached to the bottom of a vehicle, the outer surface of the hose may be contaminated with calcium chloride. It is thus desired to provide a fiber-reinforced rubber hose which hardly deteriorates even if its outer surface is contaminated with calcium chloride.

Japanese Patent Unexamined Publication JP-A-6-99515 does not disclose a fiber-reinforced rubber hose, but an oil-resistant hose. This oil-resistant hose is made of a steam vulcanizate of a first carboxyl-containing acrylic elastomer prepared by copolymerizing a monualkyl maleate, which is used as a carboxyl-containing monomer, with at least one other monomer. This publication further discloses another oil-resistant hose made of a steam vulcanizate of a blend of the first carboxyl-containing acrylic elastomer and a second carboxyl-containing acrylic elastomer prepared by copolymerizing a monoalkyl maleate, ethylene and at least one other monomer. It is disclosed in this publication that polyamine is used as a preferable vulcanizing agent for preparing the oil-resistant hose.

SUMMARY OF THE INVENTION

It is therefore an object of the present invention to provide a fiber-reinforced rubber hose which is superior in metal contact resistance and calcium chloride resistance, in addition to satisfactory heat resistance, oil resistance, pressure resistance and sealing capability, with a relatively low production cost.

According to the present invention, there is provided a fiber-reinforced rubber hose. This rubber hose comprises an inner tubular portion made of a first vulcanized rubber; an outer tubular portion which is made of a second vulcanized rubber and surrounds the inner tubular portion; and a reinforcing layer interposed between the inner and outer tubular portions. At least one of these first and second vulcanized rubbers is a carboxyl-containing acrylic elastomer prepared by vulcanizing a composition containing a carboxyl-containing acrylic copolymer. In other words, this carboxyl-containing acrylic elastomer can be prepared by vulcanizing this carboxyl-containing acrylic copolymer. The reinforcing layer is prepared from polyester fibers containing terminal carboxyl groups which are in an amount of up to 20 equivalents per metric ton of the polyester fibers.

A fiber-reinforced rubber hose according to the present invention is superior in heat resistance, oil resistance, and pressure resistance. The rubber hose is also superior in sealing capability to prevent fluid leak from a joint where a metal pipe has been pressed into the rubber hose. The rubber hose hardly deteriorates even if it is in contact with a metal pipe which has been plated for the anticorrosive purpose. In other words, the rubber hose is superior in metal contact resistance. The rubber hose hardly deteriorates even if its outer surface is contaminated with calcium chloride used as a snow melting agent.

In the invention, a polyamine may be used as a vulcanizing agent for vulcanizing the carboxyl-containing acrylic copolymer. This polyamine tends to deteriorate conventional polyester fibers used for the reinforcing layer. With this, the obtained rubber hose may become inferior in pressure resistance. The inventors, however, unexpectedly found that the above special polyester fibers hardly deteriorate by the polyamine. With this, the rubber hose of the present invention becomes superior in pressure resistance. The polyester fibers of the present invention are relatively cheaper than conventional aromatic polyamide fibers. Therefore, it becomes possible to produce a rubber hose of the present invention, with a low cost.

DESCRIPTION OF THE PREFERRED EMBODIMENTS

Figure 1:
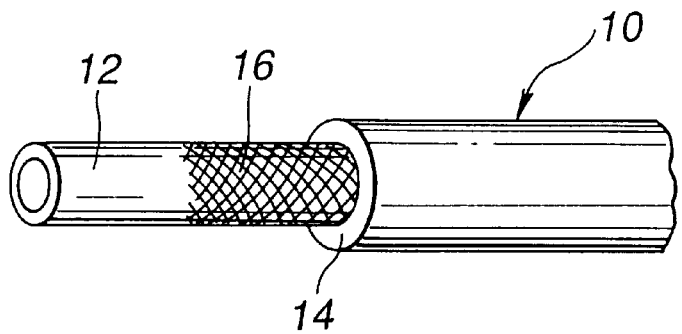
FIG. 1 is a perspective view showing a fiber-reinforced rubber hose according to the present invention, with parts broken away.

A fiber-reinforced rubber hose according to the present invention will be described in detail in the following. As is seen from FIG. 1, the fiber-reinforced rubber hose 10 has an inner tubular portion 12 made of a first rubber, an outer tubular portion 14 which is made of a second rubber and surround the inner tubular portion, and a reinforcing layer 16 interposed between the inner and outer tubular portions 12 and 14. This reinforcing layer 16 is also tubular in shape, and is woven from the above-mentioned special polyester fibers to cover the outer surface of the inner tubular portion 12, as shown in FIG. 1. It is optional to use adhesive to form the fiber-reinforced rubber hose into one-piece body.

Figure 2:
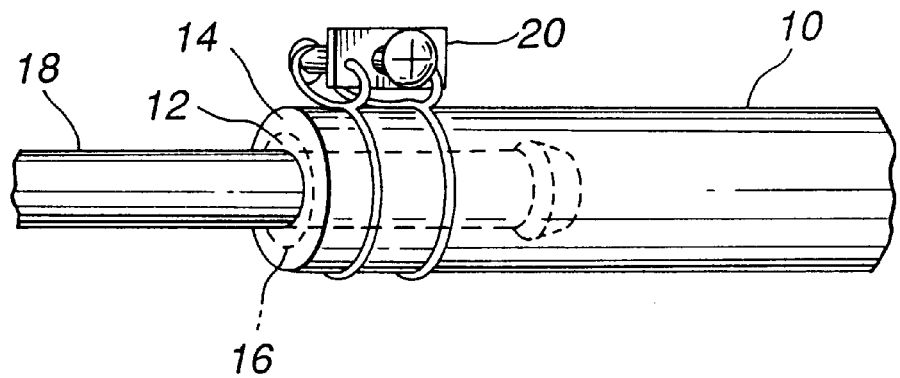
FIG. 2 is a perspective view showing a joint where a steel pipe has been pressed into the fiber-reinforced rubber hose and where a clamp is provided.

In some cases, a steel pipe 18 may be pressed into the fiber-reinforced rubber hose 10, as shown in FIG. 2.

Furthermore, a clamp 20 may he provided at a joint between the steel pipe 18 and the rubber hose 10 in order to hold them firmly together. This rubber hose 10 is required to have fluid resistance, chemical resistance, and sealing capability to prevent fluid leak from the joint. Furthermore, the rubber hose 10 is required to have heat resistance, if it is used under high temperature condition, such as engine compartment. In many cases, steel pipe is plated with Sn and Zn and treated with chromate, for the anticorrosive purpose. Thus, the rubber hose 10 is further required to have metal contact resistance against such an anticorrosive steel pipe. If a rubber hose is inferior in metal contact resistance, it may deteriorate, for example, by the contact with the anticorrosive steel pipe, by the following mechanism. That is, at first, an ester of an acrylic elastomer may be hydrolyzed into its alcohol and a carboxylic acid. Then, such carboxylic acids may ionically be bonded together with an interposal of a polyvalent metal ion derived from the anticorrosive steel pipe. With this, the acrylic elastomer may be hardened and thus a rubber hose of such acrylic elastomer may deteriorate. Therefore, as mentioned above, the rubber hose is required to have metal contact resistance to prevent its deterioration. The rubber hose 10 is still further required to have calcium chloride resistance used as a snow melting agent, in case that the rubber hose 10 is attached to the bottom of an automobile used in snowy regions.

In the invention, it is optional to assemble the unvulcanized inner and outer tubular portions 12 and 14 and the reinforcing layer 16, thereby to form a precursor of the fiber-reinforced rubber hose 10, as shown in FIG. 1. Then, this precursor may be heated in a suitable manner to vulcanize the first and second rubbers of the inner and outer tubular portions 12 and 14, thereby to prepare the rubber hose 10. In this case, the amount of terminal carboxyl groups contained in the polyester fibers may or may not be changed by this heating. In other words, polyvester fibers according to the present invention are such that the amount of the terminal carboxyl groups is up to (not greater than) 20 equivalents per metric ton of the polyester fibers, prior to this heating.

In the invention, fibers used for the reinforcing layer 16 are required to have good properties in tensile strength (breaking load), extensibility (tensile breaking extension), intermediate extensibility (elasticity), and contractibility. Furthermore, these fibers are required to have heat resistance and oil resistance, if the rubber hose is used in a high-temperature atmosphere such as automotive engine compartment and allows a high-temperature fluid such as automotive automatic transmission fluid to pass therethrough. Still furthermore, these fibers are required to have chemical resistance against various chemicals contained in the rubber material. In general, polyester fibers may deteriorate by polyamine used as the vulcanizing agent. However, as mentioned above, the inventors unexpectedly found that the special polyester fibers according to the present invention hardly deteriorates by the polyamine.

In the invention, the carboxyl-containing acrylic elastomer may be prepared by vulcanizing a carboxyl-containing acrylic copolymer, using an vulcanizing agent that is not particularly limited. Polyamine may be used as a preferable example of this vulcanizing agent. Nonlimitative examples of this polyamine are hexamethylene diamine carbamate, hexamethylene diamine, tetramethylene pentamine, 4,4'-methylenediamine, m-phenylenediamine, and 4,4'-diaminodiphenyl ether. The polyamine is preferably in air amount of from about 0.1 to about 10 parts by weight per 100 parts by weight of the unvulcanized carboxyl-containing acrylic copolymer. If its amount is less than this range, the vulcanized rubber hose may become insufficient in tensile strength. If its amount is greater than this range, the vulcanized rubber hose may become inferior in extensibility. In the invention, the vulcanization of the carboxyl-containing acrylic copolymer may be conducted in the presence of other additives, such as carbon, a plasticizer, an antioxidant, stearic acid, a processing aid, and a vulcanization accelerator.

The following nonlimitative examples are illustrative of the present invention.

EXAMPLE 1-1

In this example, a carboxyl-containing acrylic elastomer was prepared, as follows. At first, a composition was prepared by mixing a carboxyl-containing acrylic copolymer (NOXTITE PA512E (trade name) of Nippon Mektron Co.) with 4,4-diaminodiphenyl ether (CHEMINOX CLP 5000 (trade name) of Nippon Mektron Co.), carbon, a plasticizer (ADEKACIZER RS735 (trade name) of Asahi Denka Kougyou Co.), an antioxidant (NOCRAC NBC (trade name) of Ohutisinkou Kagaku Kougyou Co.), stearic acid, a processing aid (PHOSPHANOL RL210 (trade name) of Touhou Kagaku Co.), and a vulcanization accelerator (NOCCELER PR and NOCCELER DT (trade names) of Ohutisinkou Kagaku Kougyou Co.), in amounts shown in Table 1. Then, this composition was subjected to a press vulcanization for 20 min at 160° C. and then to an oven vulcanization for 5 hr at 175° C., thereby to obtain the carboxyl-containing acrylic elastomer in the form of a sheet having a thickness of 2 mm.

Then, the obtained elastomers (test samples) each were subjected to the following evaluation tests. The results of these evaluation tests are shown in Table 1. Tensile strength and extension of the obtained test sample were measured, and its hardness was measured by using a JIS-A type hardness tester. The result of this hardness is shown by the unit of "Hs". Separately, another test sample was subjected to a beat aging resistance test by allowing the test sample to stand still in an atmosphere of 175° C. for 72 hr. After this test, tensile strength, extension and hardness of the test sample were measured in the same manners as above, to determine the changes in these before and after the heat aging resistance test. Separately, another test sample was subjected to an oil resistance test by immersing the test sample in an automotive automatic transmission fluid (NISSAN GENUINE AUTOMATIC FLUID D (ATF-D) which is a trade name of Nissan Motor Company Ltd.) at 150° C. for 72 hr. After this test, tensile strength, extension and hardness of the test sample were measured in the same manners as above, to determine the changes in these before and after the oil resistance test. Regarding the results of the change in hardness before and after the oil resistance test, 1 point is the same as 1 Hs. Furthermore, volume of the test sample was measured to determine the change of volume before and after the oil resistance test. Separately, compressive permanent strain of another test sample was determined, in accordance with Japanese Industrial Standard (JIS) K 6301, after standing still in an atmosphere of 150° C. for 72 hr under a condition that the test sample had been compressed by 25% based on the thickness of the test sample. Separately, another test sample was subjected to a metal contact resistance test. In this test, two steel plates were plated with Sn and Zn and treated with chromate. After that, the test sample was interposed between these steel plates, and then compressed by 25% based on the thickness of the test sample. Under this condition, this sandwich was allowed to stand still in a thermostat heated at 175°C. Then, every 24 hr this sandwich was taken from the thermostat, and then the test sample was folded down 180 degrees to see whether or not cracks occur in the test sample. Thus, time when cracks occurred in the test sample was recorded as the result (see Table 1).

COMPARATIVE EXAMPLES 1-1–1-7

In these comparative examples, Example 1 was repeated except in that the kinds and amounts of the unvulcanized rubber components, the vulcanizing agents, and the other additives were changed as shown in Table 1. In fact, VAMAC HG (trade name) of E.I. du Pont de Nemours and Co, was used an ethylene-copolymerized carboxyl-containing acrylic copolymer in Comparative Examples 1-1 and 1-2, ER 8401 (trade name) of Denki Kagaku Koagyou Co. was used as an ethylene-vinylacetate copolymerized acrylic copolymer in Comparative Example 1-3, NOXTITE PA212 (trade name) of Nippon Mektron Co. was used as a chloro-containing acrylic copolymer in Comparative Example 1-4 and 1-5, and NOXTITE PA302 (trade name) of Nippon Mektron Co. was used as an epoxy-containing acrylic copolymer in Comparative Examples 1-6 and 1-7. Furthermore, hexamethylene diamine carbamate (DIAK No. 1 (trade name) of E. I. du Pont de Nemours and Co.) was used as a polyamine in Comparative Example 1-2. In Comparative Example 1-4, NONSAAL SK-1 (trade name) of Nippon Yusi Co. was used as potassium stearate (metallic soap). In Comparative Examples 1-2, 1-3, 1-6 and 1-7, NONFLEX DCD (trade name) of Seiko Kagaku Co. was ureed as an antioxidant. In Comparative Examples 1-4 and 1-5, NOCRAC B (trade name) of Ohutisinkou Kagaku Kougyou Co. was used as an antioxidant. In Comparative Example 1-3, liquid paraffin, MORESCO WHITE P70 (trade name) of Matsumura Petroleum Laboratory, was used as a processing aid. In Comparative Example 1-2, NOC-CELER DT (trade name) of Ohutisinkou Kagaku Kougyou Co. was used as a vulcanization accelerator. In Comparative Example 1-3, EMARL 10 (trade name) of Kao Co. was used as a vulcanization accelerator. In Comparative Examples 1-4 and 1.5, NOCCELER EUR (trade name) of Ohutisinikou Kagaku Kougyou Co. was used as a vulcanization accelerator. In Comparative Example 1-7. NOCCELER TTFE (trade name) of Ohutisinkou Kagaku Kougyou Co. was used as a vulcanization accelerator.

TABLE 1

|  | Ex. 1-1 | Com. Ex. 1-1 | Com. Ex. 1-2 | Com. Ex. 1-3 |
|---|---|---|---|---|
| Unvulcanized Rubber Components (parts by wt.) | | | | |
| Carboxyl-containing Acrylic Copolymer | 100 | 80 | — | — |
| Ethylene-copolymerized Carboxyl-containing Acrylic Copolymer | — | 20 | 100 | — |
| Ethylene-vinylacetate-copolymerized Acrylic Copolymer | — | — | — | 100 |
| Vulcanizing Agents (parts by wt.) | | | | |
| Polyamine | 0.5 | 0.5 | 0.5 | — |
| Imidazole | — | — | — | 3.0 |
| Other Additives (parts by wt.) | | | | |
| Carbon | 65.0 | 70.0 | 70.0 | 70.0 |
| Plasticizer | 10.0 | 10.0 | 10.0 | 10.0 |
| Antioxidant | 2.0 | 2.0 | 2.0 | 2.0 |

TABLE 1-continued

| Stearic Acid | 2.0 | 2.0 | 2.0 | 2.0 |
|---|---|---|---|---|
| Processing Aid | 1.0 | 1.0 | 1.0 | 1.0 |
| Vulcanization Accelerator | 2.0 | 2.0 | 4.0 | 2.0 |
| Initial Properties | | | | |
| Tensile Strength (MPa) | 12.5 | 10.9 | 12.4 | 12.4 |
| Extension (%) | 290 | 300 | 450 | 180 |
| Hardness (Hs) | 73 | 76 | 76 | 75 |
| Changes before and after Heat Aging Resistance Test | | | | |
| Tensile Strength (%) | −3 | −25 | −6 | −3 |
| Extension (%) | −10 | −2 | −21 | −25 |
| Hardness (points) | +6 | +10 | +3 | +11 |
| Changes before and after Oil Resistance Test | | | | |
| Volume (%) | +0.2 | +3.7 | +8.7 | +12.7 |
| Tensile Strength (%) | +6 | +9 | ±0 | −9 |
| Extension (%) | +7 | −29 | +6 | +28 |
| Hardness (points) | ±0 | ±0 | −7 | −3 |
| Compressive Permanent Strain (%) | 19 | 17 | 43 | 27 |
| Metal Contact Resistance (hr) | 552 | 48 | 96 | 168 |

|  | Com. Ex. 1-4 | Com. Ex. 1-5 | Com. Ex. 1-6 | Com. Ex. 1-7 |
|---|---|---|---|---|
| Unvulcanized Rubber Components (parts by wt.) | | | | |
| Chloro-containing Acrylic Copolymer | 100 | 100 | — | — |
| Epoxy-containing Acrylic Copolymer | — | — | 100 | 100 |
| Vulcanizing Agents (parts by wt.) | | | | |
| Potassium Stearate | 3.0 | — | — | — |
| Triazine | — | 0.6 | — | — |
| Ammonium Benzoate | — | — | 2.0 | — |
| Dithiocarbamate | — | — | — | 2.0 |
| Other Additives (parts by wt.) | | | | |
| Carbon | 70.0 | 70.0 | 70.0 | 70.0 |
| Plasticizer | 10.0 | 10.0 | 10.0 | 10.0 |
| Antioxidant | 2.0 | 2.0 | 2.0 | 2.0 |
| Stearic Acid | 2.0 | 2.0 | 2.0 | 2.0 |
| Processing Aid | 1.0 | 1.0 | 1.0 | 1.0 |
| Vulcanization Accelerator | 1.5 | 3.0 | — | 1.0 |
| Initial Properties | | | | |
| Tensile Strength (MPa) | 12.1 | 13.3 | 12.8 | 11.5 |
| Extension (%) | 320 | 223 | 304 | 190 |
| Hardness (Hs) | 69 | 73 | 72 | 77 |
| Changes before and after Heat Aging Resistance Test | | | | |
| Tensile Strength (%) | −20 | — | — | −25 |
| Extension (%) | −19 | — | — | −35 |
| Hardness (points) | +11 | — | — | +11 |
| Changes before and after Oil Resistance Test | | | | |
| Volume (%) | +2.3 | — | — | +1.5 |
| Tensile Strength (%) | −30 | — | — | −1 |
| Extension (%) | −31 | — | — | +23 |
| Hardness (points) | −1 | — | — | −4 |
| Compressive Permanent Strain (%) | 49 | — | — | 56 |
| Metal Contact Resistance (hr) | 48 | 48 | 48 | 312 |

EXAMPLE 2-1

In this example, one polyester fiber of 1,500 denier having terrninal carboxyl groups in an amount of 15 equivalents per metric ton of this polyester fiber was evaluated by each of the following evaluation tests. The results of these tests are shown in Table 2. In each test, tensile strength of each polyester fiber (test sample) was measured in accordance with JIS L 1013. In fact, one test sample was subjected to a first deterioration test by allowing the test sample to stand still in an atmosphere of 150° C. for 240 hr, followed by the tensile strength measurement. Separately, another test sample was subjected to a second deterioration test by immersing the test sample for 240 hr in an automatic transmission fluid heated at 140° C., which was the same as that of Example 1-1, followed by the tensile strength measurement. Separately, another test sample was subjected to a third deterioration test by allowing the test sample to stand still for 20 min in a chamber of 164° C. used for steam vulcanization of rubber hoses, followed by the tensile strength measurement. Separately, another test sample was subjected to a fourth deterioration test. In this test, the test sample was interposed between two unvulcanized sheets each made of a mixture of the same carboxyl-containing acrylic copolymer as that of Example 1-1 and the same polyarnine (4,4'-diaminodiphenyl ether) as that of Example 1-1. Then, the obtained sandwich was heated at 160° C. for 20 min in a manner to conduct a press vulcanization of these sheets. Then, this sandwich was allowed to stand still in an atmosphere of 120° C. for 120 hr. After that, the test sample was taken from this sandwich and then subjected to the tensile strength measurement. The tensile strength reduction (%) was found by an expression of $[(F_0-F_1)/F_0] \times 100$ where $F_0$ is the initial tensile strength and $F_1$ is the tensile strength after each deterioration test.

According to the invention, the polyester fibers contain terminal carboxyl groups in an amount of up to 20 equivalents per metric ton of the polyester fibers. If the amount of the terminal carboxyl groups is greater than 20 equivalents per metric ton thereof, the above-defined tensile strength reduction after the fourth deterioration test may become not lower than 20%, as shown in the after-mentioned Comparative Example 2-1. With this, the fiber-reinforced rubber hose may become inferior in pressure resistance. It may be possible to sufficiently increase the initial tensile strength of polyester fibers, which have terminal carboxyl groups in an amount of greater than 20 equivalents per metric ton thereof, by making these polyester fibers thicker in thickness or by increasing the number of these polyester fibers used for making the reinforcing layer. However, a reinforcing layer prepared from these polyester fibers not according to the present invention becomes substantially higher in production cost than that prepared from the polyester fibers according to the present invention. In the invention, the thickness of the polyester fibers and the number of the polyester fibers used for making the reinforcing layer may arbitrarily be decided, in order to provide a fiber-reinforced rubber hose which is superior in pressure resistance and other characteristics.

COMPARATIVE EXAMPLES 2-1–2-3

In these comparative examples, Example 2-1 was repeated except in that the test sample was replaced with the following fibers. A polyester fiber of 1,500 denier having terminal carboxyl groups in an amount of 35 equivalents per metric ton of this polyester fiber was used as each test sample in Comparative Example 2-1. In Comparative 2-2, a thread having a yarn number count of 20, prepared by twining three polyvinyl alcohol fibers, was used as each test sample. In Comparative Example 2-3, a 6,6-nylon fiber of 1,260 denier was used as each test sample. In Comparative Example 2-2, the test sample was melted in the third deterioration test, and thus it was impossible to measure tensile strength after this test.

TABLE 2

| | Ex. 2-1 | Com. Ex. 2-1 | Com. Ex. 2-2 | Com. Ex. 2-3 |
|---|---|---|---|---|
| Initial Tensile Strength (kgf) | 12.5 | 12.6 | 9.6 | 12.0 |
| Tensile Strength Reduction (%) | | | | |
| after 1st Deterioration Test | 6.4 | 12.7 | 68.5 | 13.3 |
| after 2nd Deterioration Test | 6.4 | 17.6 | 11.5 | 17.5 |
| after 3rd Deterioration Test | 14.4 | 22.2 | — | 30.8 |
| after 4th Deterioration Test | 6.4 | 62.7 | 3.1 | 5.0 |

In general, a rubber hose used for automotive tubing for cooling down an automatic transmission fluid is required to allow the fluid heated at a highest temperature of about 140° C. to flow therethrough and to be resistant to a highest fluid pressure of about 12 kgf/cm². In case that this rubber hose is disposed in an automotive engine compartment, the outer surface of the rubber hose is further required to be resistant to high temperature. Such a rubber hose is required to have a so-called bursting pressure of at least 60 kgf/cm² and a so-called sealing capability of at least 25 kgf/cm², after a heat aging at 150° C. for 72 hr, as described in the after-mentioned Example 3-1. If a rubber hose is attached to a Sn—Zn plated steel pipe, the rubber hose is required not to easily deteriorate by the pipe. For example, such a rubber hose is required not to have cracks by a heat aging for 700 hr at 150° C. In case that a rubber hose is attached to the bottom of a vehicle, the outer surface of the hose may be contaminated with calcium chloride (snow mellting agent). It is thus desired to provide a rubber hose which hardly deteriorates by calcium chloride. For example, such a rubber hose is required not have cracks after allowing the rubber hose to stand still for 480 hr at 120° C., while the outer surface is kept in contact with calcium chloride.

EXAMPLE 3-1

In this example, there was prepared a fiber-reinforced rubber hose having a structure shown in FIG. 1. In fact, there were prepared inner and outer tubular portions each being made of a carboxyl-containing acrylic elastomer which is the same as that of Example 1-1. Furthermore, a reinforcing layer was prepared from polyester fibers which are the same as the polyester fiber of Example 2-1.

The obtained rubber hose (test sample) having an inner diameter of 7.5 mm, an outer diameter of 15.0 mm and an axial length of 300 mm was subjected the following evaluation tests. The results of these evaluation tests are shown in Table 3.

Figure 3:
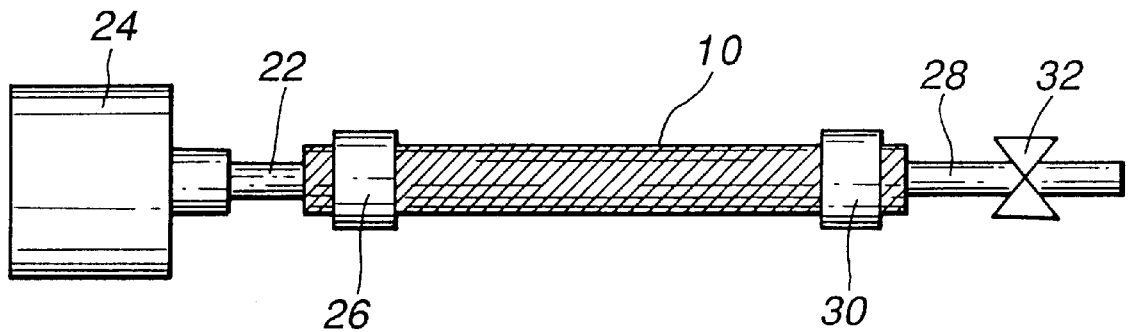
FIG. 3 is a plan showing a device for determining bursting pressure and sealing capability of the fiber-reinforced rubber hose.

At first the test sample was subjected to a bursting pressure measurement, as shown in FIG. 3. In this measurement, a pipe 22 attached to a hydraulic pump 24 was pressed into an end portion of the rubber hose 10. Then, a clamp 26 was attached to this end portion in order to firmly attach the rubber hose 10 to this pipe 22. Separately, another pipe 28 was pressed into the other end portion of the rubber hose 10. Then, another clamp 30 was attached to this end portion in order to firmly attach the rubber hose 10 to this pipe 28. The end of this pipe 28 was closed by a valve 32. Under this condition, hydraulic pressure was gradually added to the rubber hose 10 from the hydraulic pump 24 at a pressure increase rate of from 10 to 20 kgf/cm². A hydraulic pressure when the rubber hose 10 had burst was recorded as the initial bursting pressure. The result of this measurement is shown in Table 3. Separately, another test sample was subjected to a heat aging by allowing this test sample to stand still in an atmosphere of 150° C. for 72 hr, under a condition that this test sample was filled with an automotive automatic transmission fluid. After this heat aging, the same bursting pressure measurement as above was conducted.

Another test sample was subjected to the following sealing capability test. As shown in FIG. 2, a metal pipe 18 having a major portion of a dianeter of 8.0 mm and an end projection portion of a diameter of 9,3mm was pressed into each end portion of the test sample. Then, a so-caled screw-type clamp shown in FIG. 2 was attached to each end portion of the test sample. Thus, as shown in FIG. 3, there was prepared a device for conducting the sealing capability test which was similar to the above bursting pressure measurement. In other words, hydraulic pressure was gradually added to the rubber hose 10 from the hydraulic pump 24 at a pressure increase rate of from 10 to 20 kgf/cm$^2$. A hydraulic pressure when the rubber hose had come out of the pipe or when water had leaked from the end of the rubber hose was recorded as the result of the initial sealing capability. In other words, the rubber hose came out of the pipe at a hydraulic pressure of 39 kgf/cm$^2$, as shown in Table 3. Separately, another test sample was subjected to the same heat aging as above, under the same condition as above. After this heat aging, the same sealing capability test as above was conducted. With this test, water leaked from the end portion of the rubber hose when the hydraulic pressure was 30 kgf/cm$^2$, as shown in Table 3.

Another test sample was subjected to the following metal contact resistance test. At first, the Sn—Zn plated steel pipe 18 was pressed into an end portion of the test sample, as shown in FIG. 2. Then, the screw-type clamp 20 was attached to the end portion of the test sample. Under this condition, the test sample was allowed to stand still in an atmosphere of 150° C., while the test sample was filled with an automotive automatic transmission fluid. After 750 hr of this standing still, the end portion of the test sample was cut in a manner to expose the inner surface of the test sample. With this, no cracks were found therein. After 1,000 hr of this standing still, the end portion thereof was cut again. With this, cracks were found therein.

Another test sample was subjected to the following calcium chloride resistance test. In this test, the test sample was allowed to stand still in an atmosphere of 120° C. for 480 hr, while a calcium chloride saturated aqueous solution was applied to the outer surface of the test sample at an interval of 12 hr. Then, the test sample was folded down by about 180 degrees to see whether or not cracks occur in the outer surface thereof. In Table 3, "A" As means that no cracks occurred, and "B" means that cracks occurred.

TABLE 3

| | Ex. 3-1 | Com. Ex. 3-1 | Com. Ex. 3-2 | Com. Ex. 3-3 | Com. Ex. 3-4 |
|---|---|---|---|---|---|
| Initial Bursting Pressure (kgf/cm$^2$) | 89.4 | 32.8 | 79.8 | 85.7 | 88.1 |
| Bursting Pressure after Heat Aging (kgf/cm$^2$) | 89.5 | — | 24.3 | 17.1 | 78.3 |
| Initial Sealing Capability | Coming Out at 39 kgf/cm$^2$ | — | Coming Out at 39 kgf/cm$^2$ | Coming Out at 26 kgf/cm$^2$ | Leak at 27 kgf/cm$^2$ |
| Sealing Capability after Heat Aging | Leak at 30 kgf/cm$^2$ | — | Leak at 30 kgf/cm$^2$ | Leak at 22 kgf/cm$^2$ | Leak at 23 kgf/cm$^2$ |
| Calcium Chloride Resistance | A | B | B | B | A |

COMPARATIVE EXAMPLE 3-1

In this comparative example, Example 3-1 was repeated except in that the inner and outer tubular portions of the rubber hose were each made of an ethylene-copolymerized carboxyl-containing acrylic elastomer which is the same as that of Comparative Example 1-2 and that the reinforcing layer was prepared from polyester fibers which are the same as the polyester fiber of Comparative Example 2-1. As shown in Table 3. the initial bursting pressure was substantially low due to deterioration of the reinforcing layer upon the vulcanization (heating) of the precursor of the rubber hose.

COMPARATIVE EXAMPLE 3-2

In this comparative example, Example 3-1 was repeated except in that the inner and outer tubular portions of the rubber hose were each made of a combination of an ethylene-copolymerized carboxyl-containing acrylic elastomer and a carboxyl-containing acrylic elastomer, which combination is the same as that of Comparative Example 1-1 and that the reinforcing layer was prepared from polyvinyl alcohol fibers which are the same as the polyvinyl alcohol fiber of Comparative Example 2-2.

In the metal contact resistance test, no cracks were found therein after the standing still for 240 hr, and cracks were found after the standing still for 360 hr.

COMPARATIVE EXAMPLE 3-3

In this comparative example, Example 3-1 was repeated except in that the inner and outer tubular portions of the rubber hose were each made of a chlora-containing acrylic elastomer which is the same as that of Comparative Example 1-4 and that the reinforcing layer waas prepared from 6,6-nylon fibers which are the same as the 6,6-nylon fiber of Comparative Example 2-3.

In the metal contact resistance test, no cracks were found therein after the standing still for 168 hr, and cracks were found after the standing still for 192 hr.

COMPARATIVE EXAMPLE 3-4

In this comparative example, Example 3-1 was repeated except in that the inner and outer tubular portions of the rubber hose were each made of an ethylene-vinylacetate copolymerized acrylic elastomer which is the same as that of Comparative Example 1-3 and that the reinforcing layer was prepared from aromatic polyamide fibers of 1,000 denier.

In the metal contact resistance test, no cracks were found therein after the standing still for 500 hr, and cracks were found after the standing still for 750 hr.

What is claimed is:

1. A fiber-reinforced rubber hose comprising:
   an inner tubular portion made of a first rubber;

an outer tubular portion which is made of a second rubber and surrounds said inner tubular portion; and a reinforcing layer interposed between said inner and outer tubular portions, wherein at least one of said first and second rubbers is a carboxyl-containing acrylic elastomer prepared by vulcanizing a composition containing a carboxyl-containing acrylic copolymer, wherein said reinforcing layer is prepared from polyester fibers containing terminal carboxyl groups which are in an amount of up to 20 equivalents per metric ton of said polyester fibers, and wherein said composition further contains a polyamine as a vulcanizing agent.

2. A rubber hose according to claim 1, wherein said polyamine is at least one compound selected from the group consisting of hexamethylene diamine carbamate, hexamethylene diamine, tetramethylene pentamine, 4,4'-methylenediamine, m-phenylenediamine, and 4,4'-diaminodiphenyl ether.

3. A rubber hose according to claim 2, wherein said polyamine is said 4,4'-diaminodiphenyl ether.

4. A rubber hose according to claim 1, wherein said polyamine is in an amount of from about 0.1 to about 10 parts by weight per 100 parts by weight of said carboxyl-containing acrylic copolymer.

5. A rubber hose according to claim 4, wherein said polyamine is in an amount of about 0.5 parts by weight per 100 parts by weight of said carboxyl-containing acrylic copolymer.

6. A rubber hose according to claim 1, wherein said composition further contains as additives carbon, a plasticizer, an antioxidant, stearic acid, a processing aid, and a vulcanization accelerator.

7. A rubber hose according to claim 1, wherein said terminal carboxyl groups of said polyester fibers are in an amount of about 15 equivalents per metric ton of said polyester fibers.

8. A rubber hose according to claim 1, wherein said polyester fibers are of about 1,500 denier.

9. A fiber-reinforced rubber hose comprising:

an inner tubular portion made of a first rubber;

an outer tubular portion which is made of a second rubber and surrounds said inner tubular portion; and a reinforcing layer interposed between said inner and outer tubular portions, wherein at least one of said first and second rubbers is a carboxyl-containing acrylic elastomer prepared by vulcanizing a carboxyl-containing acrylic copolymer, wherein said reinforcing layer is prepared from polyester fibers containing terminal carboxyl groups which are in an amount of up to 20 equivalents per metric ton of said polyester fibers, and wherein said carboxyl-containing acrylic copolymer is vulcanized in the presence of a polyamine used as a vulcanizing agent.

* * * * *